(12) United States Patent
Brunner et al.

(10) Patent No.: US 12,221,203 B2
(45) Date of Patent: Feb. 11, 2025

(54) SYSTEM FOR INSTALLING DECORATION PANELS TO AN AIRCRAFT CEILING ASSEMBLY

(71) Applicant: The Boeing Company, Arlington, VA (US)

(72) Inventors: Jordan R. Brunner, Everett, WA (US); Justin L. Tabora, Chicago, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/440,336

(22) Filed: Feb. 13, 2024

(65) Prior Publication Data
US 2024/0182151 A1 Jun. 6, 2024

Related U.S. Application Data

(62) Division of application No. 17/383,850, filed on Jul. 23, 2021, now Pat. No. 11,932,373.

(51) Int. Cl.
*B64C 1/06* (2006.01)

(52) U.S. Cl.
CPC .................. *B64C 1/066* (2013.01)

(58) Field of Classification Search
CPC .................................................. B64C 1/066
See application file for complete search history.

(56) References Cited

U.S. PATENT DOCUMENTS

| | | | |
|---|---|---|---|
| 3,507,728 A | 4/1970 | Bock | |
| 4,050,208 A * | 9/1977 | Pompei | B64C 1/066 244/119 |
| 2004/0195445 A1 * | 10/2004 | Guard | B64C 1/066 244/118.5 |
| 2011/0024058 A1 | 2/2011 | Kernmayer | |
| 2014/0299711 A1 | 10/2014 | Ivester | |
| 2015/0232168 A1 | 8/2015 | Kircher | |
| 2016/0009356 A1 | 1/2016 | Sylvain | |
| 2019/0213990 A1 | 7/2019 | Jonza | |
| 2020/0062370 A1 | 2/2020 | Tubbs | |
| 2023/0025168 A1 | 1/2023 | Weng | |

FOREIGN PATENT DOCUMENTS

| | | |
|---|---|---|
| AT | 505901 A4 | 5/2009 |
| EP | 0437870 A1 | 7/1991 |
| EP | 1510454 A1 | 3/2005 |
| EP | 3795472 A1 | 3/2021 |

OTHER PUBLICATIONS

Extended European Search Report for corresponding European application No. 22185158.7, dated Dec. 8, 2022*.

* cited by examiner

*Primary Examiner* — Brady W Frazier
*Assistant Examiner* — Shanna Danielle Glover
(74) *Attorney, Agent, or Firm* — Walters & Wasylyna LLC

(57) ABSTRACT

In an example, a method for installing a decoration panel in a ceiling assembly in an aircraft is disclosed. The method comprises removing a generic panel from the ceiling assembly to produce an opening in the ceiling assembly. The method also comprises inserting the decoration panel through the opening in the ceiling assembly. The method also comprises coupling the decoration panel to the ceiling assembly using a plurality of fasteners such that the decoration panel extends across the opening in the ceiling assembly. The plurality of fasteners includes a first type of fastener and a second type of fastener.

20 Claims, 12 Drawing Sheets

SYSTEM FOR INSTALLING DECORATION PANELS TO AN AIRCRAFT CEILING ASSEMBLY

CROSS REFERENCE TO RELATED APPLICATION

The present application is a divisional of U.S. patent application Ser. No. 17/383,850, filed Jul. 23, 2021, the content of which is herewith incorporated by reference.

FIELD

The present disclosure relates generally to decoration panels in an aircraft, and more particularly, to installing a decoration panel in a ceiling assembly in an aircraft.

BACKGROUND

Airlines can differentiate their interior architectures from each other by installing decoration panels into the interior architecture. Such decoration panels can include custom imagery and can be fastened onto structures such as lavatories, galleys, and ceiling panels. However, existing fasteners for installing decoration panels are often visible and detract from the aesthetics of the decoration panels.

In addition, existing solutions for installing or removing decoration panels from a ceiling assembly of an aircraft typically require removal of numerous other structures of the aircraft in order to be able to access and then remove the ceiling assembly. For example, in some cases, at least a portion of the structures in the galleys, lavatories, partitions, seats, ceilings, doorway liners, and/or curtain tracks might need to be removed to be able to remove the ceiling assembly. Furthermore, existing decoration panels are often rigid and thus cannot fit through a service volume of the ceiling assembly, and so in existing solutions, the ceiling assembly is typically removed and then disassembled outside of the aircraft, after which the decoration panel is installed. The ceiling assembly is then reassembled and reinstalled in the aircraft. As such, existing solutions for installing or removing a decoration panel from a ceiling assembly can be more complex and time consuming than desired.

What is needed is a less complex and more efficient way to install and remove decoration panels, while also eliminating the need to install visible and unaesthetic fasteners.

SUMMARY

In an example, a method for installing a decoration panel in a ceiling assembly in an aircraft is described. The method comprises removing a generic panel from the ceiling assembly to produce an opening in the ceiling assembly. The method also comprises inserting the decoration panel through the opening in the ceiling assembly. The method also comprises coupling the decoration panel to the ceiling assembly using a plurality of fasteners such that the decoration panel extends across the opening in the ceiling assembly. The plurality of fasteners includes a first type of fastener and a second type of fastener.

In another example, a system for installation of a decoration panel to a ceiling assembly is described. The system includes the decoration panel configured to couple to the ceiling assembly in an aircraft. The system also includes a plurality of fasteners configured to couple the decoration panel proximate an opening in the ceiling assembly based on a removal of a generic panel from the ceiling assembly. The plurality of fasteners includes a first type of fastener extending along a first edge portion of the decoration panel and a second type of fastener extending along a second edge portion of the decoration panel based on the decoration panel being coupled to the ceiling assembly proximate the opening.

In another example, an aircraft is described. The aircraft includes a fuselage. The aircraft also includes a ceiling assembly coupled to the fuselage. The aircraft also includes a decoration panel coupled to the ceiling assembly proximate to an opening in the ceiling assembly based on a removal of a valence panel from the ceiling assembly. The aircraft also includes a plurality of fasteners that couple the decoration panel to the ceiling assembly. The plurality of fasteners includes a first type of fastener extending along a first edge portion of the decoration panel and a second type of fastener extending along a second edge portion of the decoration panel based on the decoration panel being coupled to the ceiling assembly proximate the opening. The aircraft also includes the valence panel, coupled to the ceiling assembly such that the valence panel extends over an exterior circumference portion of the decoration panel and covers the plurality of fasteners.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
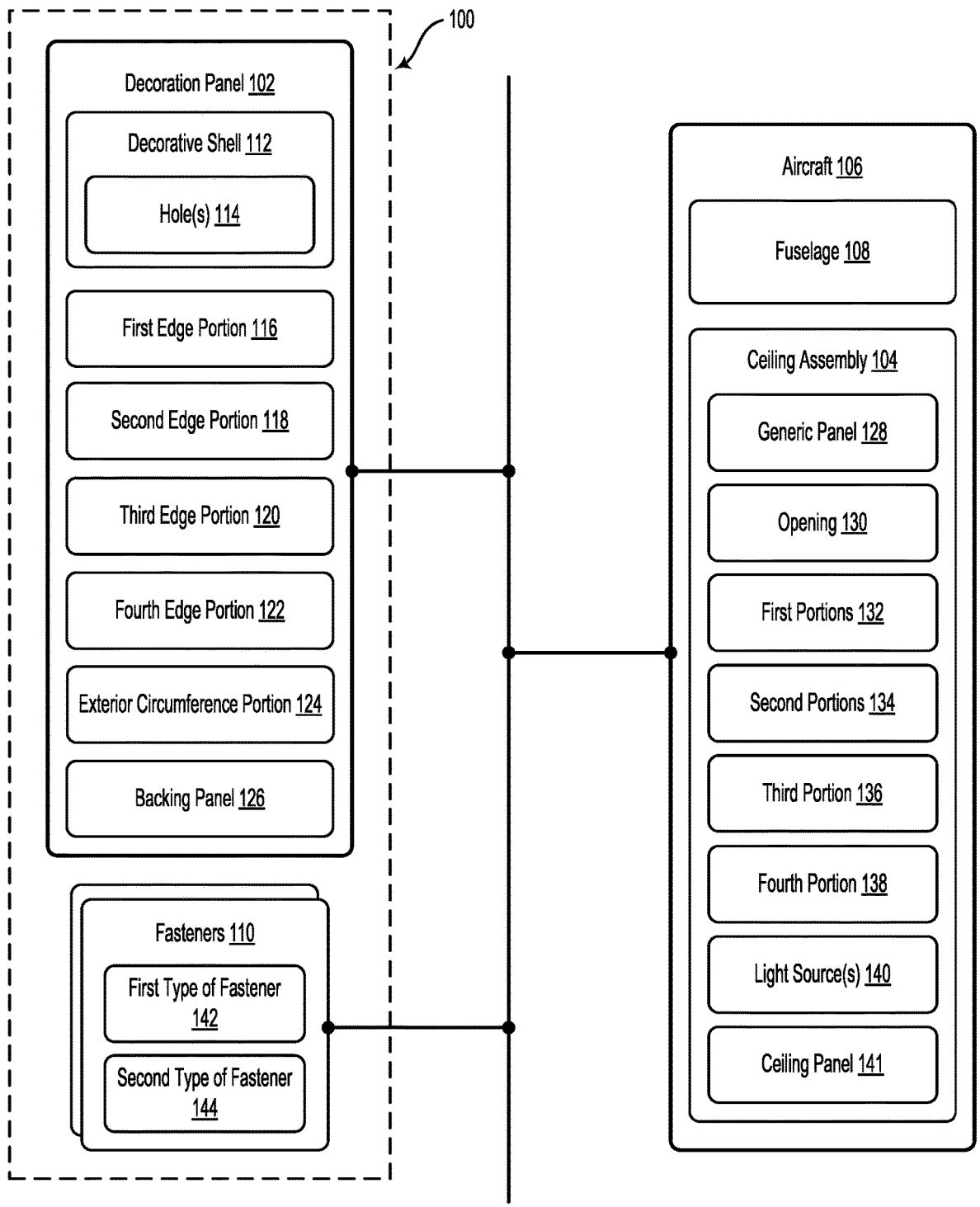
FIG. 1 depicts a system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is a method and corresponding system for attaching decoration panels to interior architecture of an aircraft, such as a ceiling assembly in the aircraft. The disclosed method includes removing a generic panel from the ceiling assembly to produce an opening in the ceiling assembly. The disclosed method then involves inserting the decoration panel through the opening in the ceiling assembly, and coupling the decoration panel to the ceiling assembly using a plurality of fasteners such that the decoration panel extends across the opening in the ceiling assembly.

The plurality of fasteners include a first type of fastener and a second type of fastener, such as hooks and clamp hooks, each of which is described herein in detail and can usefully couple to the ceiling assembly. In some cases, the plurality of fasteners hook onto the ceiling assembly without having to be fastened to the ceiling assembly. Thus, the decoration panel can be more easily removed.

Within examples, the generic panel is a valence panel that couples to the ceiling assembly such that the valence panel extends over an exterior circumference portion of the decoration panel and covers the plurality of fasteners, which can thus prevent the plurality of fasteners from detracting from the aesthetics of the decoration panel. The generic panel can be the original panel that was installed with the ceiling assembly during the initial assembly of the aircraft.

The disclosed method is also performed without decoupling at least a portion of the ceiling assembly from the fuselage of the aircraft. For example, the decoration panel is coupled to the ceiling assembly without having to first remove and disassemble any part of the ceiling assembly from the interior of the aircraft. In some cases, the decoration panel can be coupled to the ceiling assembly without having to remove at least a portion of the other interior architecture, surrounding the ceiling assembly, from the interior of the aircraft. This reduces the complexity of, and time spent for, installing decoration panels or replacing decoration panels in the aircraft.

These and other improvements are described in more detail below. Implementations described below are for purposes of example. The implementations described below, as well as other implementations, may provide other improvements as well.

Although the disclosed method is described primarily in the context of aircrafts, it should be understood that the disclosed method can be used in various other contexts, such as installing decoration panels in other types of vehicles, or in or in environments other than vehicles.

Referring now to the figures, FIG. 1 depicts a system 100, according to an example implementation. The various elements of system 100 could be formed from one or more materials such as aluminum, steel, plastic, and/or another material. Furthermore, it will be understood that, in addition to the parts of the elements shown in FIG. 1, any of such elements can include parts that are not explicitly shown in FIG. 1.

The system 100 includes a decoration panel 102 that is configured to couple to a ceiling assembly 104 in an aircraft 106. The aircraft 106 includes a fuselage 108 to which the ceiling assembly 104 is coupled. For example, the fuselage 108 has interior architecture (e.g., a ceiling) that includes the ceiling assembly 104 or to which the ceiling assembly 104 is removably coupled. The system 100 also includes a plurality of fasteners 110 that couple the decoration panel 102 to the ceiling assembly 104.

The decoration panel 102 is an ornamental panel that has one or more decorative features, such as aesthetic features. To facilitate this, the decoration panel 102 includes a decorative shell 112 having one or more holes 114 that form one or more designs. The size, shape, pattern, etc. of the one or more holes 114 can be selected to achieve a particular aesthetic, for instance. Within examples, the decoration panel 102 is at least semi-flexible and is generated using one or more materials (e.g., fiberglass) that are configured to endure temperatures above a threshold temperature (e.g., 500 degrees Fahrenheit) for at least a threshold time period (e.g., five minutes). For example, the decoration panel 102 is generated via an injection molding process such that the decoration panel 102 includes the one or more designs formed by the one or more holes 114. The one or more holes 114 can include one or more blind holes and/or one or more through holes.

As shown, the decoration panel 102 also includes a first edge portion 116, a second edge portion 118, a third edge portion 120, a fourth edge portion 122, and an exterior circumference portion 124. These portions will be described in more detail with respect to later figures.

As further shown, the decoration panel 102 includes a backing panel 126. Within examples, the backing panel 126 is coupled to the decorative shell 112, such as by way of an adhesive or fastener, among other possible coupling methods. When the decoration panel 102 is coupled to the ceiling assembly 104, the backing panel 126 is positioned between the decorative shell 112 and a surface of the ceiling assembly 104. Within examples, the backing panel 126 is at least semi-flexible and is generated using one or more materials (e.g., fiberglass) that are configured to endure temperatures above a threshold temperature (e.g., 500 degrees Fahrenheit) for at least a threshold time period (e.g., five minutes). In alternative examples, the decoration panel 102 does not include the backing panel 126, and the decorative shell 112 is coupled directly to the ceiling assembly 104.

Both the decorative shell 112 and the backing panel 126 have a particular shape and contour based on the ceiling assembly 104. For example, the decorative shell 112 and the backing panel 126 can be designed to have a shape and contour that at least partially matches the shape and contour of the ceiling assembly 104.

The ceiling assembly 104 includes a generic panel 128, an opening 130, first portions 132, second portions 134, a third portion 136, a fourth portion 138, one or more light sources 140, and a ceiling panel 141. The first portions 132, the second portions 134, the third portion 136, and the fourth portion 138 are described in more detail below in the context of coupling the decoration panel 102 to the ceiling assembly 104. Within examples, the ceiling panel 141 is a panel of the ceiling assembly 104 accessed through the opening 130, and the first portions 132, the second portions 134, the third portion 136, and the fourth portion 138 are all portions of the ceiling panel 141 to which the decoration panel 102 is fastened. Further, within such examples, the decorative shell 112 and the backing panel 126 can be designed to have a shape and contour that at least partially matches the shape and contour of the ceiling panel 141.

The one or more light sources 140 are positioned in the ceiling assembly 104 and can include, for instance, light-emitting diodes (LEDs) or other types of light sources that provide ambient lighting. Further, the one or more light sources 140 are positioned in the ceiling assembly 104 such that the one or more light sources 140 provide ambient lighting that extends around a perimeter of the decoration panel 102, which can emphasize and add to the aesthetics of the decoration panel 102.

Within examples, the generic panel 128 is a generic panel that was installed with the ceiling assembly 104 during the original integration and assembly of the aircraft 106. That is, the generic panel 128 is one of at least a subset of components of the ceiling assembly 104 that are used in the assembly of the aircraft 106 and is/are thus present in the aircraft 106 prior to installation of the decoration panel 102. Further, the generic panel 128 is removably coupled to the ceiling assembly 104 so that the generic panel 128 can be removed when installing the decoration panel 102. Within additional examples, the generic panel 128 is a valence panel that is coupled to the ceiling assembly 104 such that, after the plurality of fasteners 110 have been used to couple the decoration panel 102 to the ceiling assembly 104, the valence panel extends over the exterior circumference portion 124 of the decoration panel 102 and covers the plurality of fasteners 110.

Within examples, a surface area of the decoration panel 102 is greater than an area of the opening 130 in the ceiling assembly 104. As discussed in more detail below, based on a removal of the generic panel 128 from the ceiling assembly 104 and due to the difference in surface area of the decoration panel 102 from the area of the opening 130, the decoration panel 102 can be flexed in order to insert the decoration panel 102 through the opening 130 and couple the decoration panel 102 to the ceiling assembly 104 proximate (e.g., within a few inches or less from) the opening 130 using the plurality of fasteners 110.

The plurality of fasteners 110 are configured to couple the decoration panel 102 proximate the opening 130 in the ceiling assembly 104 based on a removal of the generic panel 128 from the ceiling assembly 104. The plurality of fasteners 110 include a first type of fastener 142 and a second type of fastener 144. The first type of fastener 142 extends along the first edge portion 116 of the decoration panel 102 and the second type of fastener 144 extends along the second edge portion 118 of the decoration panel 102 based on the decoration panel 102 being coupled to the ceiling assembly 104 proximate the opening 130. Within examples, the first type of fastener 142 is or includes a hook and the second type of fastener 144 is or includes a clamp hook. The hooks and clamp hooks can be secured to edges of existing architecture of the aircraft 106, such as the ceiling panel 141 of the ceiling assembly 104.

Figure 2:
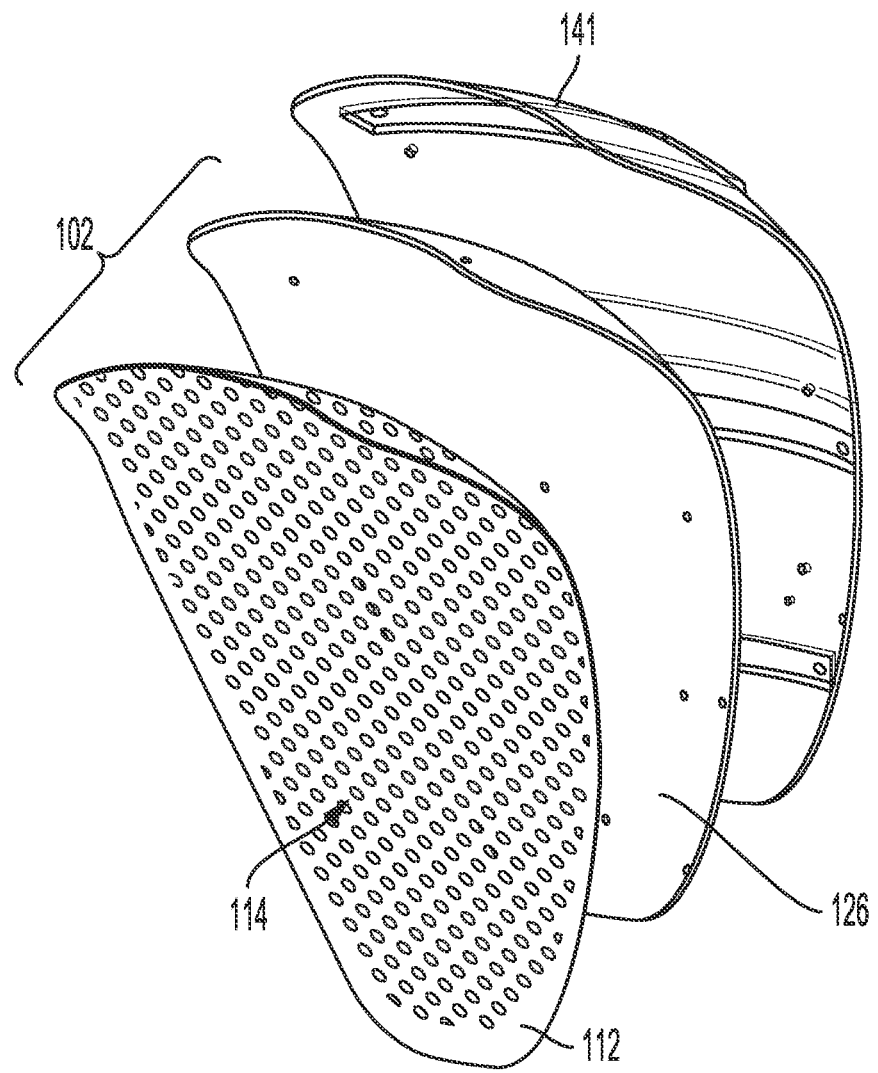
FIG. 2 depicts a decoration panel, a backing panel, and a ceiling panel, in accordance with an example implementation.

FIG. 2 next depicts the decoration panel 102 and a portion of the ceiling assembly 104, in accordance with an example implementation. In particular, FIG. 2 depicts an exploded view of the decorative shell 112, the backing panel 126, and the ceiling panel 141 of the ceiling assembly 104 to which the decoration panel 102 is coupled. The reminder of the ceiling assembly 104 is not explicitly shown in FIG. 2.

As further shown in FIG. 2, the decorative shell 112 has the one or more holes 114 that form a particular design, and both the decorative shell 112 and the backing panel 126 have a shape and contour that matches the ceiling panel 141.

FIGS. 3-17 depict various scenarios of a method for installing the decoration panel 102 in the ceiling assembly 104 in the aircraft 106. In some implementations of the method, the decoration panel 102 is coupled to the ceiling assembly 104 without decoupling at least a portion of the ceiling assembly 104 from the fuselage 108. The fuselage 108 is not explicitly shown in FIGS. 3-17. In the example implementation of the method shown in FIGS. 3-17, the decoration panel 102 is coupled to the ceiling assembly 104 without decoupling any portion of the ceiling assembly 104 from the fuselage 108.

Figure 3:
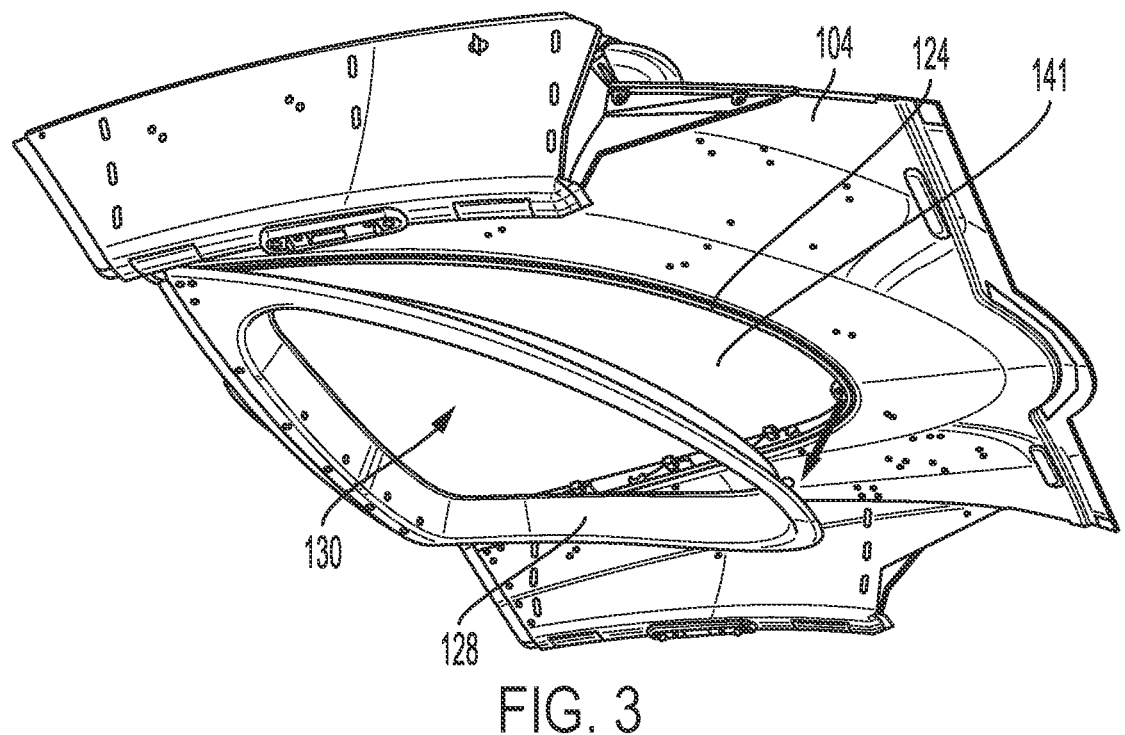
FIG. 3 depicts a scenario in which a generic panel is removed from the ceiling assembly to allow for insertion of a decoration panel, in accordance with an example implementation.
Figure 4:
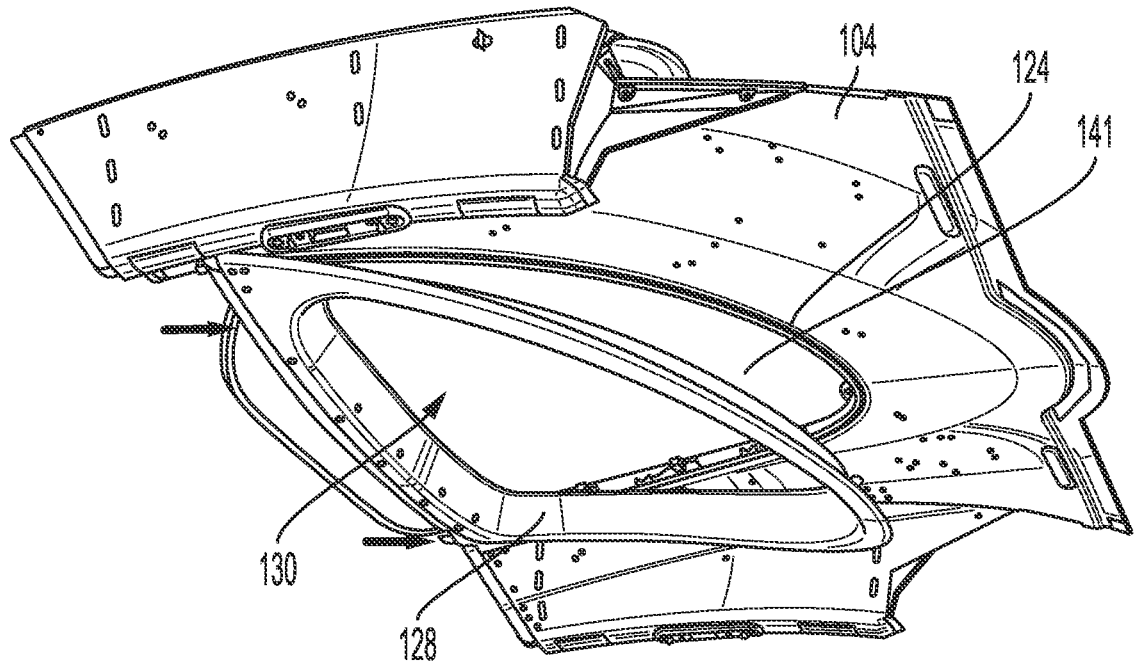
FIG. 4 depicts another scenario in which a generic panel is removed from the ceiling assembly to allow for insertion of a decoration panel, in accordance with an example implementation.
Figure 5:
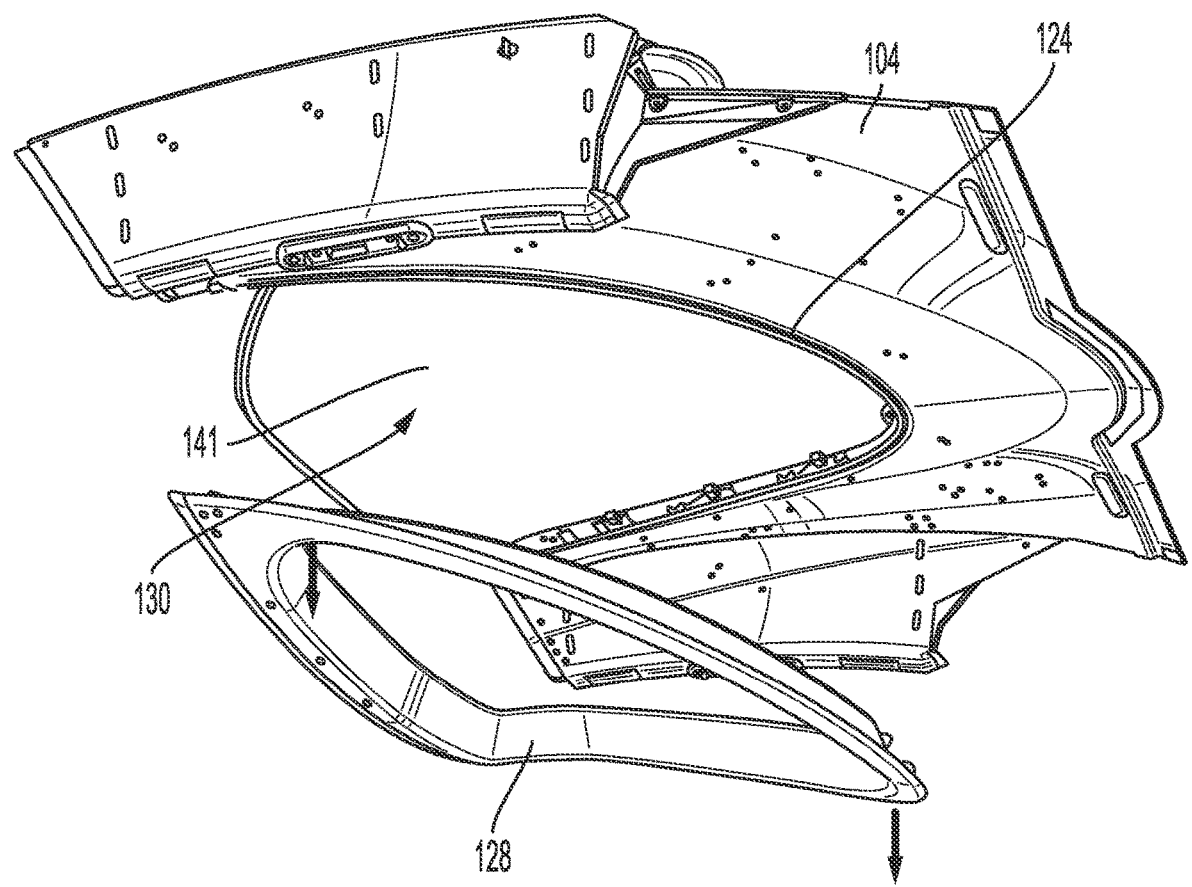
FIG. 5 depicts another scenario in which a generic panel is removed from the ceiling assembly to allow for insertion of a decoration panel, in accordance with an example implementation.

FIG. 3, FIG. 4, and FIG. 5 each depict a respective step in a scenario in which the generic panel 128 (e.g., a valence panel) is removed from the ceiling assembly 104 to produce the opening 130 in the ceiling assembly 104. In each of FIGS. 3-5, arrows are included to show a direction the generic panel 128 is moved during the removal.

In some cases, such as the embodiment shown in FIGS. 3, 4, and 5, the generic panel 128 itself has an opening that is smaller than the opening 130 in the ceiling assembly 104. In other cases, the generic panel 128 can include a transparent material (e.g., glass) through which the decoration panel 102 (not shown), when installed, is visible, and the transparent material can block access to the opening 130 based on the generic panel 128 being coupled to the ceiling assembly 104. The generic panel 128 shown in FIGS. 3, 4, and 5, when coupled to a remainder of the ceiling assembly 104, extends over the exterior circumference portion 124 of the ceiling assembly 104. Further, as shown, the generic panel 128 is curved and has an opening that is smaller in size, but similar in shape, to the opening 130 and to the decoration panel 102 shown in FIG. 2.

Figure 6:
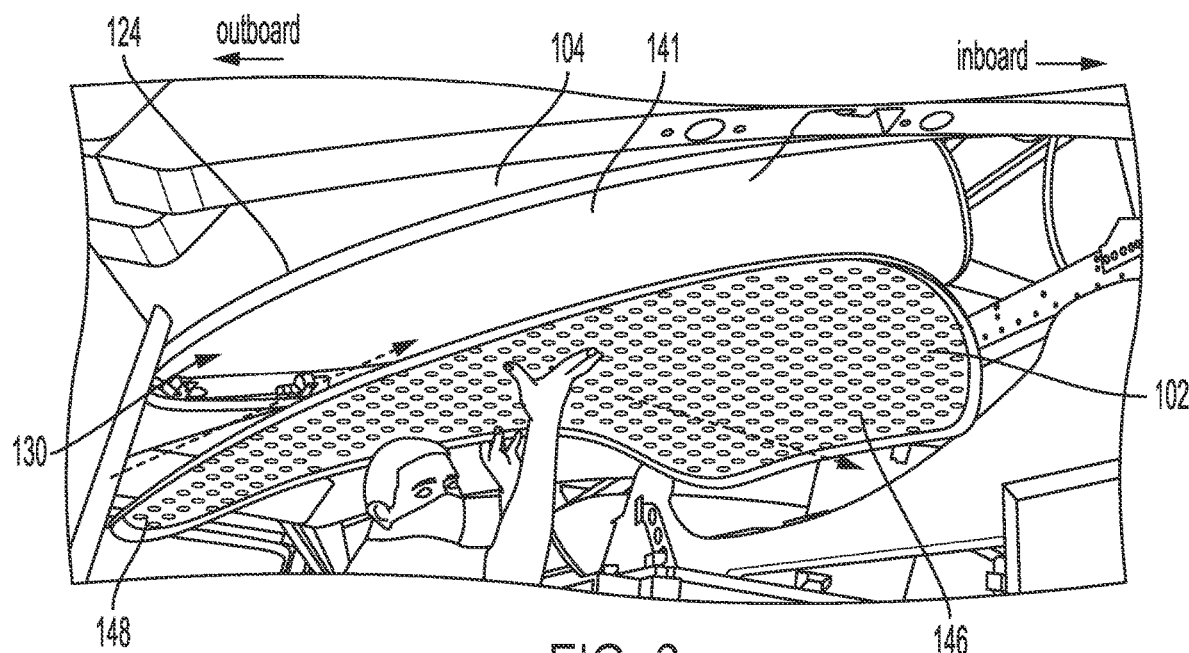
FIG. 6 depicts a scenario in which a decoration panel is inserted into an opening in a ceiling assembly, in accordance with an example implementation.
Figure 7:
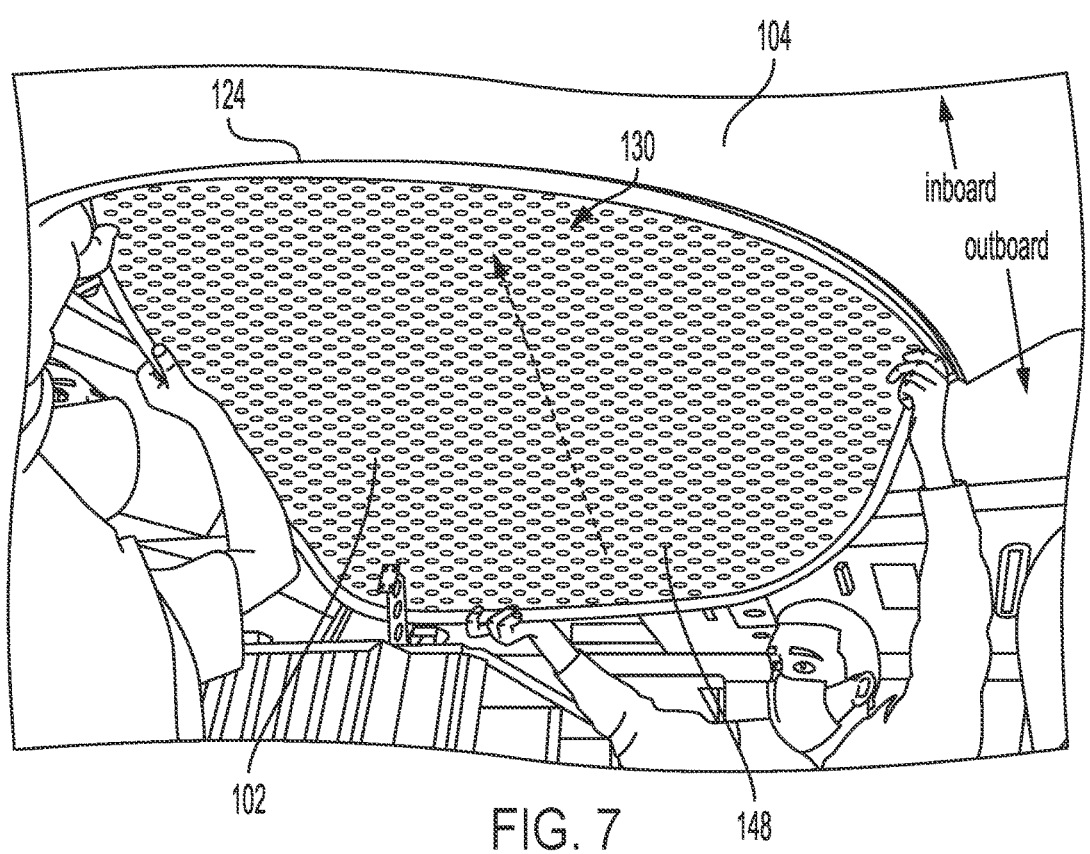
FIG. 7 depicts another scenario in which a decoration panel is inserted into an opening in a ceiling assembly, in accordance with an example implementation.

Next, FIG. 6 and FIG. 7 each depict a respective step in a scenario in which the decoration panel 102 is inserted through the opening 130 in the ceiling assembly 104. In each of FIGS. 6-7, dashed arrows are included to show directions the decoration panel 102 is moved during the insertion.

FIG. 6 depicts a first end 146 of the decoration panel 102 being slid in an inboard direction until a second end 148 of the decoration panel 102, opposite the first end 146, can be lifted upwards into the ceiling assembly 104.

FIG. 7 then depicts the second end 148 of the decoration panel 102 being lifted upwards into the ceiling assembly 104.

As noted above, the decoration panel 102 is at least semi-flexible in some implementations. Based on the surface area of the decoration panel 102 exceeding an area of the opening 130 in the ceiling assembly 104, the decoration panel 102 is flexed during insertion through the opening 130 and then released such that the decoration panel 102 un-flexes inside the ceiling assembly 104 and proximate the opening 130 in the ceiling assembly 104. Thus, the decoration panel 102 can be efficiently maneuvered and positioned in the ceiling assembly 104 where and when desired.

In alternative implementations, the decoration panel 102 can be flexed, inserted, and un-flexed in other manners and direction than those shown in FIGS. 6-7. Further, in other alternative implementations, the decoration panel 102 can be rigid and inflexible.

With the decoration panel 102 inserted through the opening 130, the decoration panel 102 is then coupled to the ceiling assembly 104 using the plurality of fasteners 110 of FIG. 1 such that the decoration panel 102 extends across the opening 130 in the ceiling assembly 104. FIGS. 8-15 depict various techniques and arrangements in which the decoration panel 102 is coupled to the ceiling panel 141 of the ceiling assembly 104, but it should be understood that in alternative implementations, the decoration panel 102 can be coupled to additional or alternative parts of the ceiling assembly 104.

Figure 8:
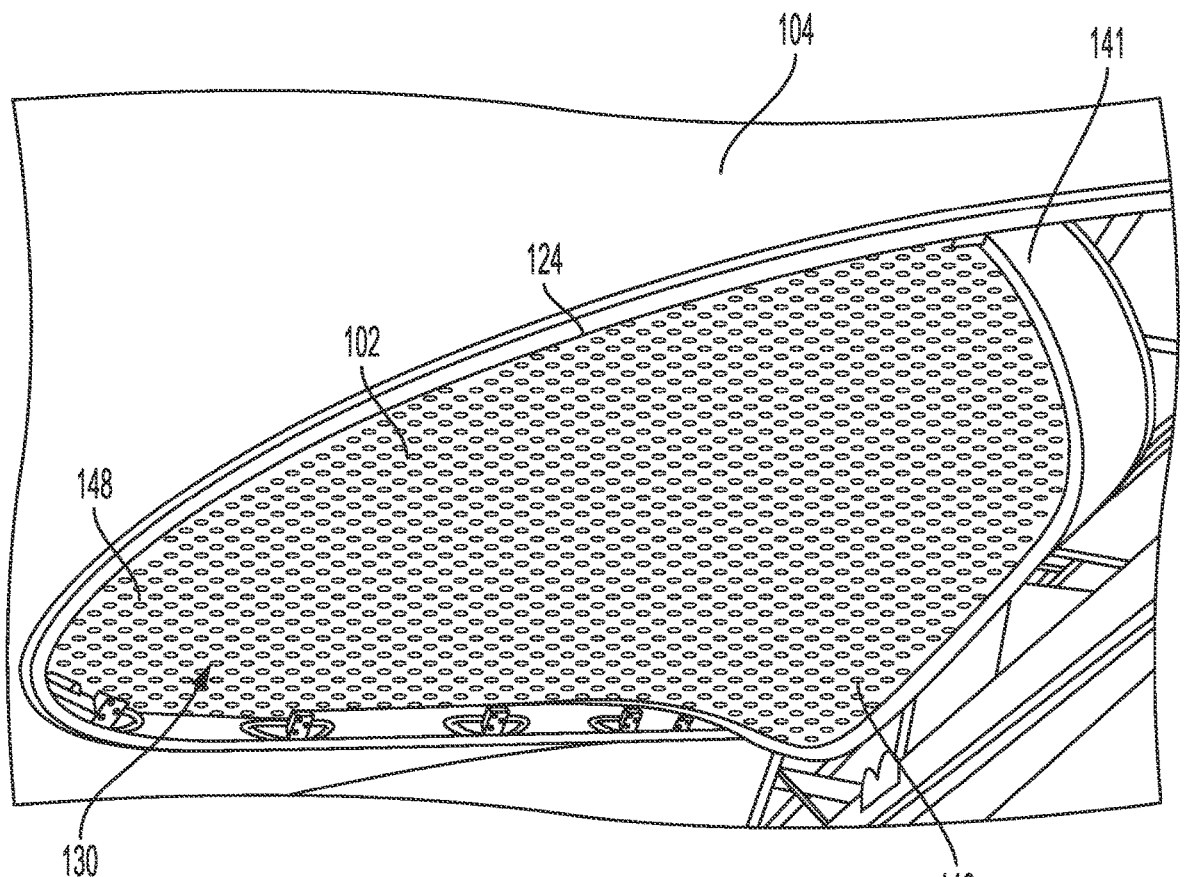
FIG. 8 depicts a scenario in which a plurality of fasteners couple a decoration panel to a ceiling assembly, in accordance with an example implementation.

FIG. 8 depicts the decoration panel 102 partially coupled to the ceiling panel 141 proximate (e.g., within a threshold distance from, such as within 15 centimeters from) the opening 130 in the ceiling assembly 104. That is, the second end 148 and sides of the decoration panel 102 have been coupled to the ceiling panel 141, but the first end 146 has not yet been coupled.

As discussed above, the plurality of fasteners 110 include a first type of fastener 142 and a second type of fastener 144, which, in some implementations, take the form of a set of one or more hooks and a set of one or more clamp hooks, respectively. The set of hooks and the set of clamp hooks are configured to facilitate efficient coupling of the decoration panel 102 to the ceiling panel 141.

Figure 9:
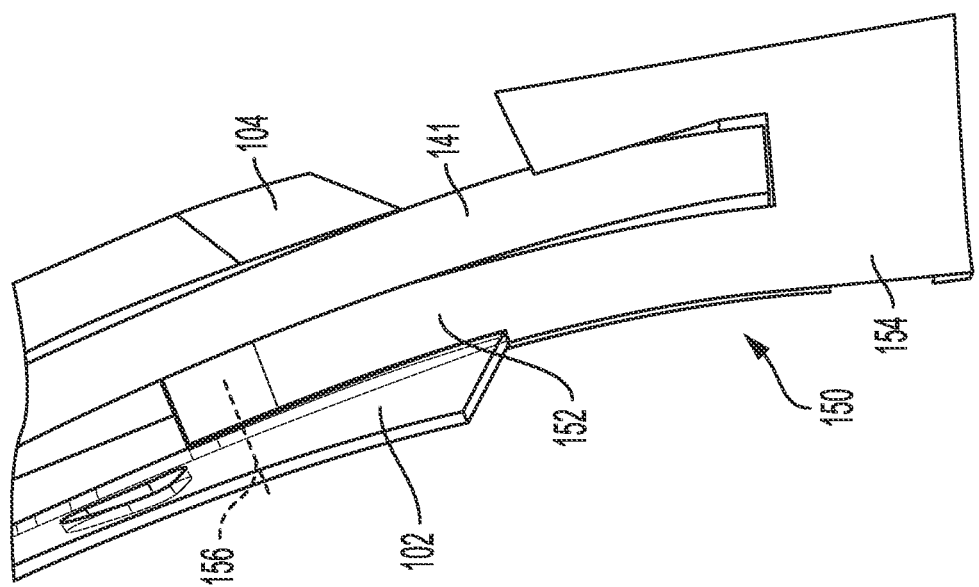
FIG. 9 depicts a representative hook of a plurality of fasteners, in accordance with an example implementation.

FIG. 9 depicts a representative example of a hook 150 and the manner in which the hook 150 hooks onto the ceiling panel 141. Each hook of the set of hooks can take the form of hook 150. As shown, the hook 150 includes a spacer portion 152 and a hook portion 154. The spacer portion 152 provides space between the ceiling panel 141 and the decoration panel 102, and the hook portion 154 hooks onto the ceiling panel 141. FIG. 9 also shows an axis 156 indicating a location at which a screw, bolt, or other fastener could be used to couple the hook 150 to the decoration panel 102.

Figure 10:
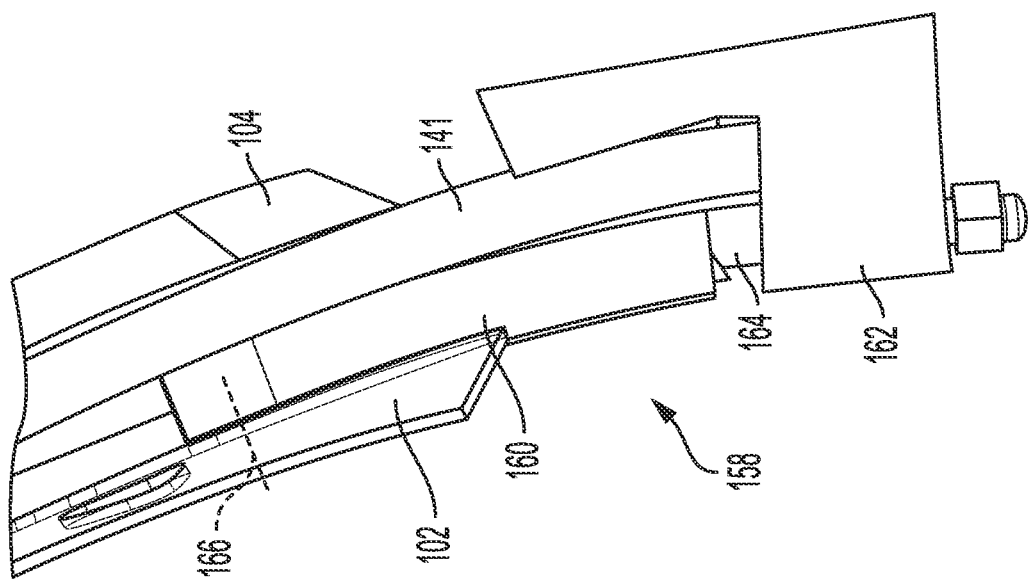
FIG. 10 depicts a representative clamp hook of a plurality of fasteners, in accordance with an example implementation.

FIG. 10 depicts a representative example of a clamp hook 158 and the manner in which the clamp hook 158 hooks onto the ceiling panel 141. Each clamp hook of the set of clamp hooks can take the form of clamp hook 158. As shown, the clamp hook 158 includes a spacer portion 160, a hook portion 162, and a bolt 164. The spacer portion 160 provides space between the ceiling panel 141 and the decoration panel 102, the hook portion 162 hooks onto the ceiling panel 141, and the bolt 164 is tightened or loosened to decrease or increase slack, respectively, on the decoration panel 102. Tightening the bolt 164 also pulls sides of the decoration panel 102 away from a center of the decoration panel 102. FIG. 10 also shows an axis 166 indicating a location at which a screw, bolt, or other fastener could be used to couple the clamp hook 158 to the decoration panel 102.

By using the set of hooks and the set of clamp hooks, the decoration panel 102 can be coupled to the ceiling panel 141 or another portion of the ceiling assembly 104 without having to fasten the decoration panel 102 to the ceiling panel 141 or other portion of the ceiling assembly 104. Thus can reduce the time and complexity of installing and removing the decoration panel 102.

In some implementations, the plurality of fasteners 110 can include a set of one or more through insert fasteners, additionally or alternatively to the set of hooks and/or the set of clamp hooks. In contrast to the set of hooks and the set of clamp hooks, the set of through insert fasteners can involve a fastener inserted through the ceiling panel 141, but such an arrangement can provide additional structural support for the decoration panel 102 when desired.

Figure 11:
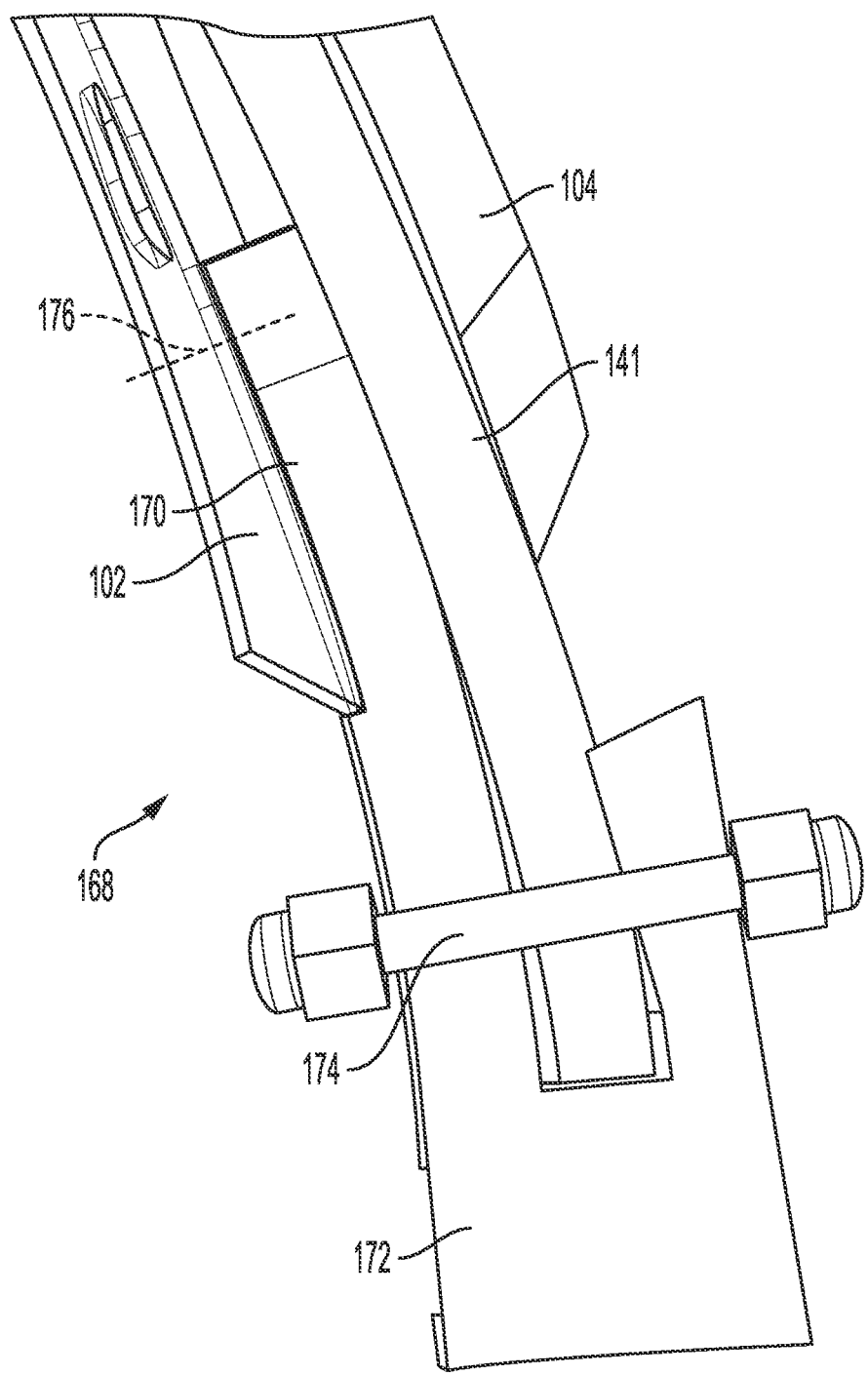
FIG. 11 depicts a representative through insert fastener of a plurality of fasteners, in accordance with an example implementation.

FIG. 11 depicts a representative example of a through insert fastener 168 and the manner in which the through insert fastener 168 hooks and fastens onto the ceiling panel 141. Each through insert fastener of the set of through insert fasteners can take the form of through insert fastener 168. As shown, the through insert fastener 168 includes a spacer portion 170, a hook portion 172, and a bolt 174. The spacer portion 170 provides space between the ceiling panel 141 and the decoration panel 102, the hook portion 172 hooks onto the ceiling panel 141, and the bolt 174 holds the decoration panel 102 in place, such as in the event that one or more hooks of the set of hooks and/or one or more clamp hooks of the set of clamp hooks are damaged or are decoupled from the decoration panel 102 and/or the ceiling panel 141. FIG. 11 also shows an axis 176 indicating a location at which a screw, bolt, or other fastener could be used to couple the through insert fastener 168 to the decoration panel 102.

In some implementations, the plurality of fasteners 110 are fastened to the decoration panel 102 using screws, bolts, or other fasteners as described above before the decoration panel 102 is inserted through the opening 130 and coupled to the ceiling panel 141. In other implementations, the decoration panel 102 is first inserted through the opening 130 and positioned at a desired location for coupling to the ceiling panel 141, and then the plurality of fasteners 110 are fastened to the decoration panel 102 and coupled to (e.g., hooked onto) the ceiling panel 141.

Although the types of fasteners described above and shown in FIGS. 9, 10, and 11 each have a respective spacer portion, it should be understood that in some implementations, the plurality of fasteners 110 do not include spacer portions and are instead fastened to the decoration panel 102 on a surface opposite the surface that faces the ceiling panel 141.

FIGS. 12, 13, 14, and 15 next depict example arrangements of where the plurality of fasteners 110 are located for coupling the decoration panel 102 to the ceiling panel 141.

Figure 13:
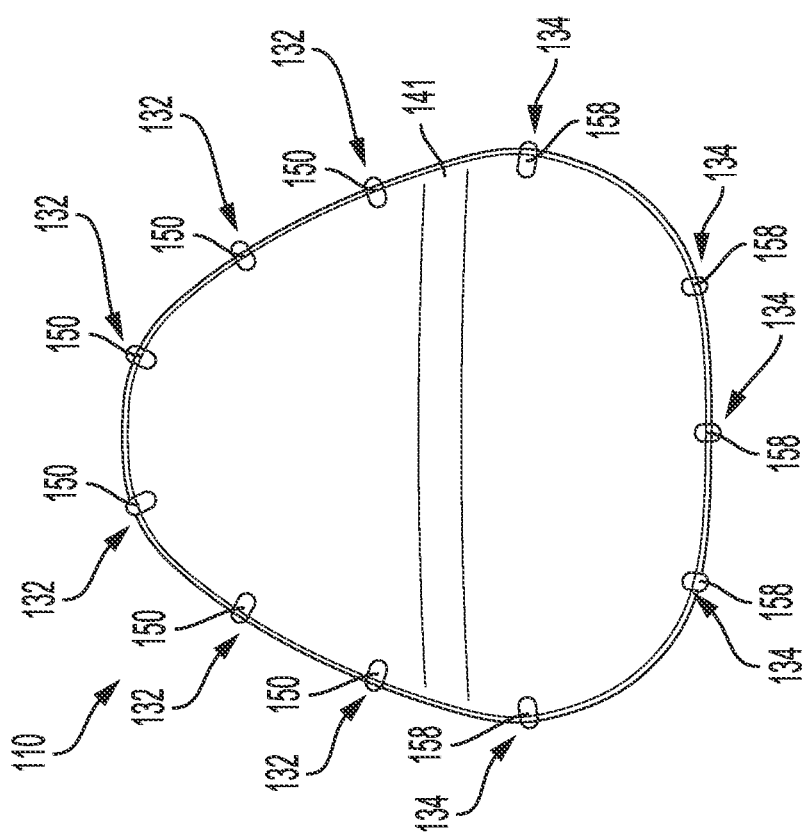
FIG. 13 depicts an arrangement of a plurality of fasteners relative to a ceiling panel of a ceiling assembly, in accordance with an example implementation.
Figure 12:
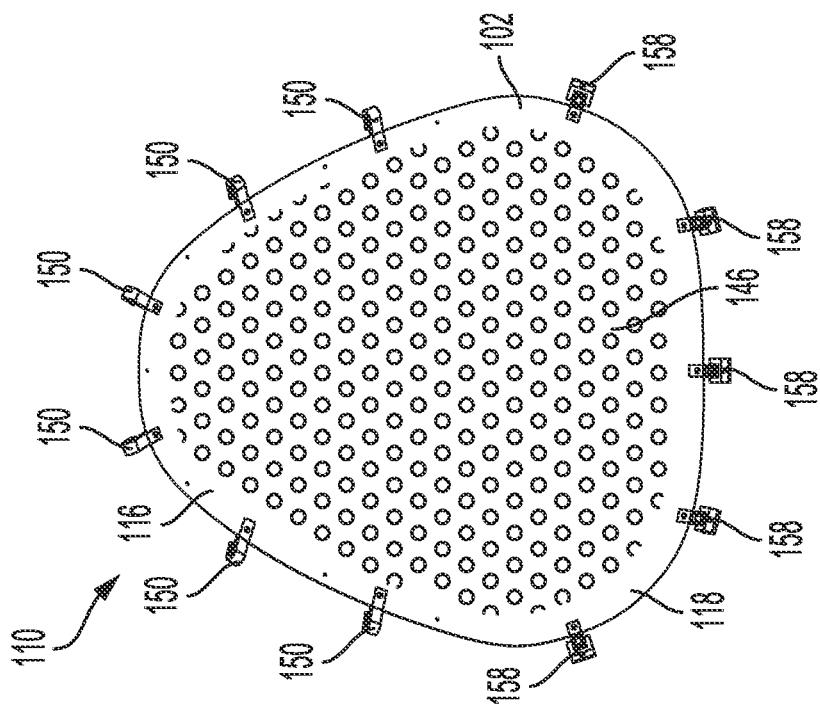
FIG. 12 depicts an arrangement of a plurality of fasteners relative to a decoration panel, in accordance with an example implementation.

FIG. 12 depicts a view of an underside of the decoration panel 102, according to an example implementation. FIG. 13 then depicts a top-down view of the ceiling panel 141 with the decoration panel 102 (not shown) coupled to an underside of the ceiling panel 141. In the arrangement shown in FIGS. 12 and 13, the plurality of fasteners 110 include a set of hooks (each designated in FIG. 12 as hook 150) that extend along the first edge portion 116 of the decoration panel 102, and the decoration panel 102 is coupled to the first portions 132 of the ceiling panel 141 such that each hook 150 is positioned to couple the first edge portion 116 of the decoration panel 102 to a corresponding one of the first portions 132 of the ceiling panel 141.

In addition, the plurality of fasteners 110 include a set of clamp hooks (each designated in FIG. 12 as clamp hook 158) that extend along the second edge portion 118 of the decoration panel 102. Subsequent to the coupling of the decoration panel 102 to the ceiling panel 141 using the set of hooks, the decoration panel 102 is coupled to the second portions 134 of the ceiling panel 141 such that each clamp hook 158 is positioned to couple the second edge portion 118 of the decoration panel 102 to a corresponding one of the second portions 134 of the ceiling panel 141.

Although not explicitly shown in FIGS. 12 and 13, each of the plurality of fasteners 110 is coupled proximate the opening 130 in the ceiling assembly 104.

Of the plurality of fasteners 110 shown in FIGS. 12 and 13, the set of hooks grab edges (e.g., the first portions 132 and the second portions 134) of the interior aircraft architecture (e.g., the ceiling panel 141), and the set of clamp hooks are tightened to pull the first end 146 of the decoration panel 102 in a direction away from a center of the decoration panel 102 (i.e., in a direction towards the set of clamp hooks from the center).

Figure 15:
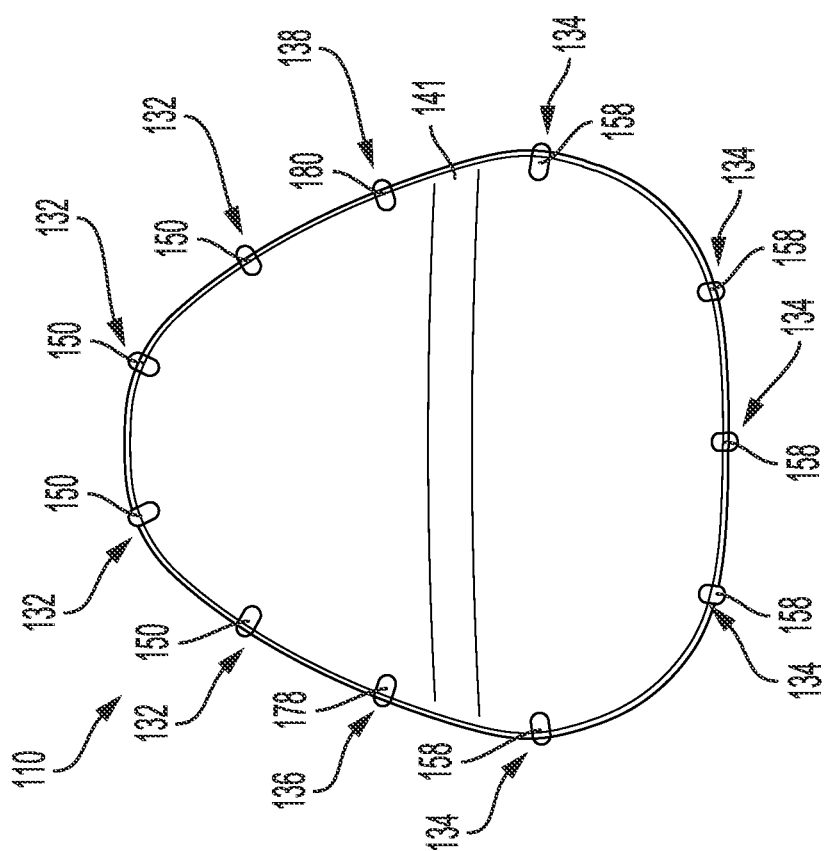
FIG. 15 depicts another arrangement of a plurality of fasteners relative to a ceiling panel of a ceiling assembly, in accordance with an example implementation.
Figure 14:
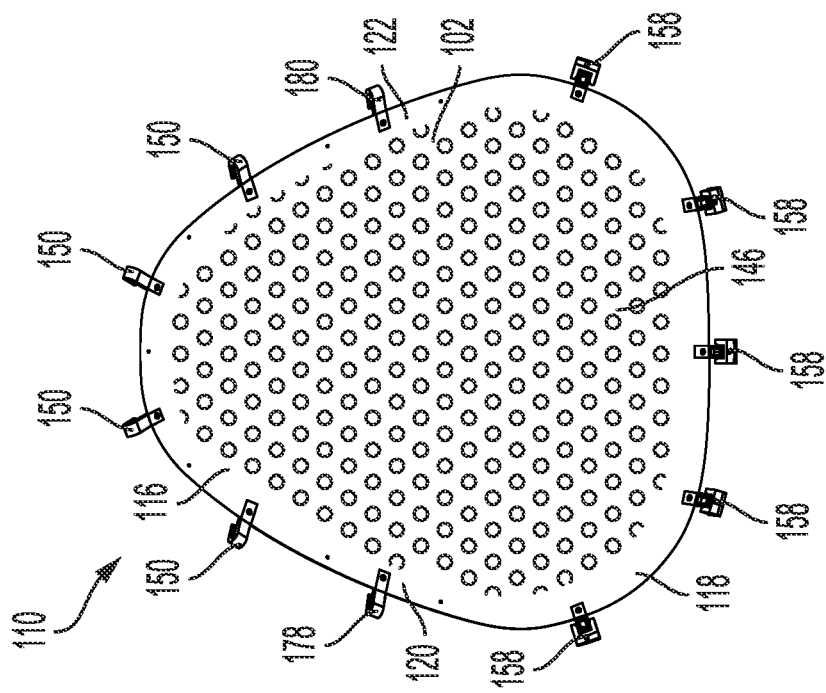
FIG. 14 depicts another arrangement of a plurality of fasteners relative to a decoration panel, in accordance with an example implementation.

FIGS. 14 and 15 next depict an arrangement in which the set of through insert fasteners are used to add additional support to hold the decoration panel 102.

FIG. 14 depicts a view of an underside of the decoration panel 102, according to an example implementation. FIG. 15 then depicts a top-down view of the ceiling panel 141 with the decoration panel 102 (not shown) coupled to an underside of the ceiling panel 141. In the arrangement shown in FIGS. 14 and 15, the plurality of fasteners 110 include a set of hooks (each designated in FIG. 12 as hook 150) that extend along the first edge portion 116 of the decoration panel 102, and the decoration panel 102 is coupled to the first portions 132 of the ceiling panel 141 such that each hook 150 is positioned to couple the first edge portion 116 of the decoration panel 102 to a corresponding one of the first portions 132 of the ceiling panel 141.

In addition, the plurality of fasteners 110 include a set of clamp hooks (each designated in FIG. 14 as clamp hook 158) that extend along the second edge portion 118 of the decoration panel 102. Subsequent to the coupling of the decoration panel 102 to the ceiling panel 141 using the set of hooks, the decoration panel 102 is coupled to the second portions 134 of the ceiling panel 141 such that each clamp hook 158 is positioned to couple the second edge portion 118 of the decoration panel 102 to a corresponding one of the second portions 134 of the ceiling panel 141.

Furthermore, the plurality of fasteners 110 include a set of through insert fasteners, designated in FIG. 14 as first through insert fastener 178 and second through insert fastener 180. In practice, each such through insert fastener can take the form of the through insert fastener 168 shown in FIG. 11. The first through insert fastener 178 is located at the third edge portion 120 of the decoration panel 102 and the second through insert fastener 180 is located at the fourth edge portion 122 of the decoration panel 102. As shown, the third edge portion 120 is on an opposite side of the decoration panel 102 relative to the fourth edge portion 122, and both the third edge portion 120 and the fourth edge portion 122 are positioned in between the first edge portion 116 and the second edge portion 118 on the circumferential edge of the decoration panel 102.

As so arranged, the decoration panel 102 is coupled to the third portion 136 and the fourth portion 138 of the ceiling panel 141 such that the first through insert fastener 178 is positioned to couple the third edge portion 120 of the decoration panel 102 to the third portion 136 of the ceiling panel 141 and the second through insert fastener 180 is positioned to couple the fourth edge portion 122 of the decoration panel 102 to the fourth portion 138 of the ceiling panel 141. Although not explicitly shown in FIGS. 14 and 15, each of the plurality of fasteners 110 is coupled proximate the opening 130 in the ceiling assembly 104.

Once the decoration panel 102 has been coupled to the ceiling assembly 104 as described above, the generic panel 128 can be reinstalled such that the generic panel 128 extends over the exterior circumference portion 124 of the decoration panel 102 and covers the plurality of fasteners 110.

Figure 16:
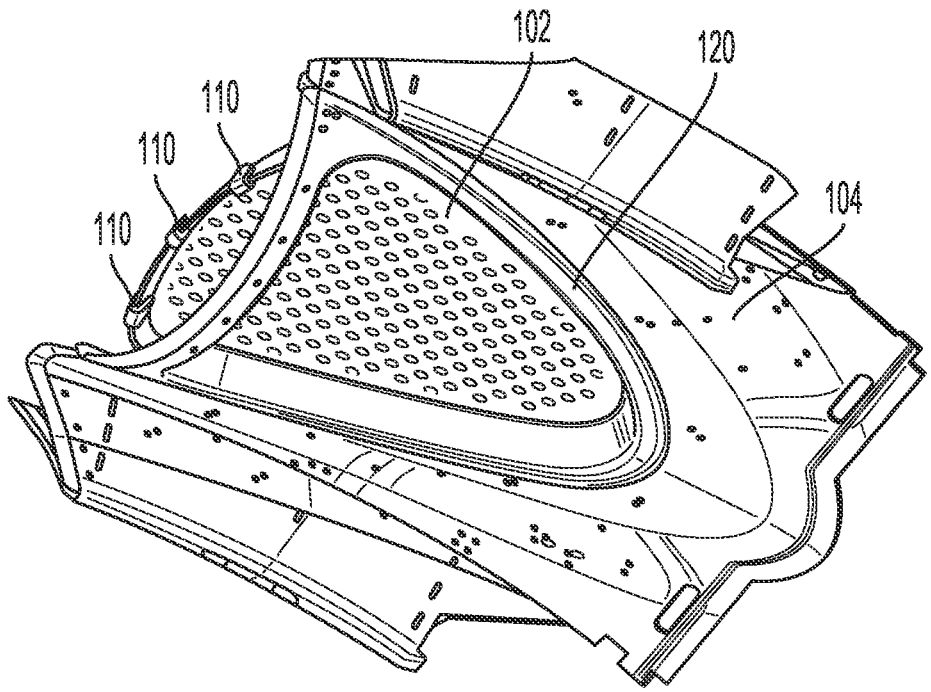
FIG. 16 depicts a scenario in which a decoration panel is installed in a ceiling assembly, in accordance with an example implementation.

FIG. 16 depicts a perspective view of an underside of the ceiling assembly 104 and the decoration panel 102, particularly in a scenario in which the generic panel 128 has been reattached to the ceiling assembly 104. As shown, most of the plurality of fasteners 110 are not shown. A portion of the other interior aircraft architecture is not shown in FIG. 16, thus making three fasteners of the plurality of fasteners 110 visible. However, in practice, none of the plurality of fasteners 110 are visible once the generic panel 128 is reinstalled.

Figure 17:
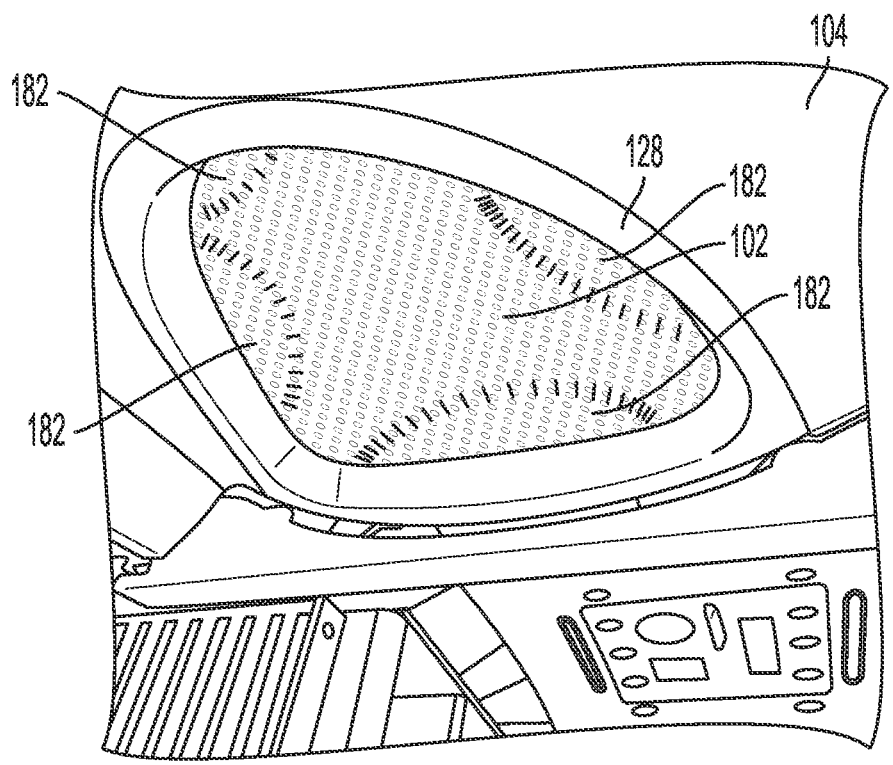
FIG. 17 depicts another scenario in which a decoration panel is installed in a ceiling assembly, in accordance with an example implementation.

FIG. 17 depicts another perspective view of an underside of the ceiling assembly 104 and the decoration panel 102, particularly in a scenario in which the generic panel 128 has been reattached to the ceiling assembly 104 and none of the plurality of fasteners 110 are visible.

As noted above, the decoration panel 102 can be illuminated using the one or more light sources 140. Although the one or more light sources 140 are not explicitly shown in FIG. 17, the one or more light sources 140 can be illuminated to provide ambient lighting 182 that extends around a perimeter of the decoration panel 102, as shown in FIG. 17. The ambient lighting 182 can emphasize the aesthetics of the decoration panel 102.

Figure 18:
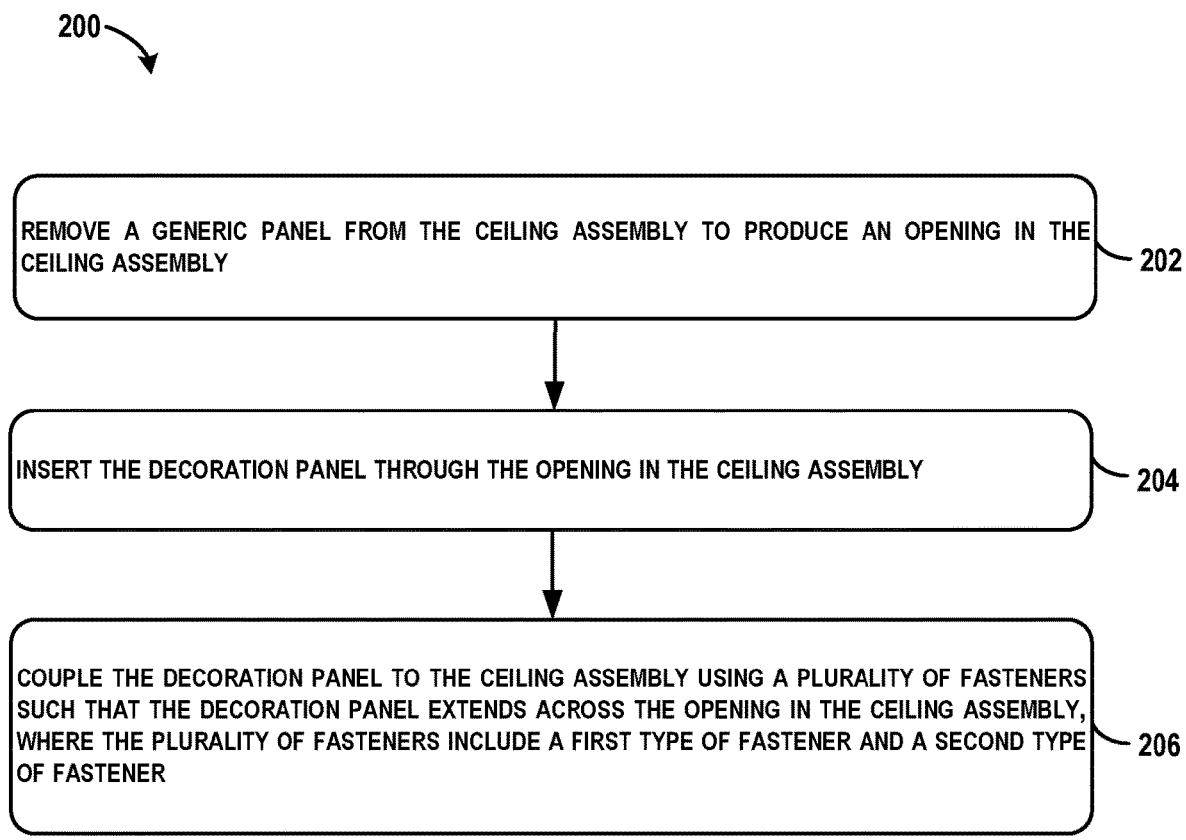
FIG. 18 shows a flowchart of an example method for installing a decoration panel in a ceiling assembly in an aircraft, according to an example implementation.

FIG. 18 shows a flowchart of an example of a method 200 for installing a decoration panel in a ceiling assembly in an aircraft. Method 200 could be used with the system 100 and components thereof shown in FIGS. 1-17. Method 200 may include one or more operations, functions, or actions as illustrated by one or more of blocks 202-206.

At block 202, the method 200 includes removing a generic panel from the ceiling assembly to produce an opening in the ceiling assembly.

At block 204, the method 200 includes inserting the decoration panel through the opening in the ceiling assembly.

At block 206, the method 200 includes coupling the decoration panel to the ceiling assembly using a plurality of fasteners such that the decoration panel extends across the opening in the ceiling assembly, where the plurality of fasteners include a first type of fastener and a second type of fastener.

In some embodiments, the removing of block 202 includes removing a valence panel from the ceiling assembly. Within examples, the method 200 can also include based on coupling the decoration panel to the ceiling assembly, reinstalling the valence panel such that the valence panel extends over an exterior circumference portion of the decoration panel and covers the plurality of fasteners.

In some embodiments, the inserting of block 204 includes flexing the decoration panel during insertion through the opening in the ceiling assembly and releasing the decoration panel such that the decoration panel un-flexes inside the ceiling assembly and proximate an opening in the ceiling assembly. In such embodiments, a surface area of the decoration panel exceeds an area of the opening in the ceiling assembly.

In some embodiments, the plurality of fasteners includes a set of hooks, and the coupling of block 206 includes coupling the decoration panel to first portions of the ceiling assembly positioned proximate the opening in the ceiling assembly using the set of hooks, where each hook is positioned to couple a first edge portion of the decoration panel to a corresponding first portion of the ceiling assembly. Within examples, the plurality of fasteners also includes a set of clamp hooks, and the method 200 also includes subsequently coupling the decoration panel to second portions of the ceiling assembly positioned proximate the opening in the ceiling assembly using the set of clamp hooks, where each clamp hook is positioned to couple a second edge portion of the decoration panel to a corresponding second portion of the ceiling assembly. Within additional examples, the set of hooks extend along the first edge portion of the decoration panel and the set of clamp hooks extend along the second edge portion of the decoration panel, and the first edge portion is different from the second edge portion. Within additional examples, the plurality of fasteners also includes through insert fasteners, and the coupling of block 206 also includes coupling the decoration panel to a third portion and a fourth portion of the ceiling assembly positioned proximate the opening in the ceiling assembly using the through insert fasteners. Within additional examples, a first through insert fastener is located at a third edge portion of the decoration panel and a second through insert fastener is located at a fourth edge portion of the decoration panel, the third edge portion and the fourth edge portion are positioned in between the first edge portion and the second edge portion, and the third edge portion is on an opposite side of the decoration panel relative to the fourth edge portion.

In some embodiments, the method 200 also includes generating the decoration panel via an injection molding process such that the decoration panel includes one or more designs. In such embodiments, the method 200 also includes generating a decorative shell having one or more holes that form the one or more designs, and coupling the decorative shell to a backing panel, where the decoration shell and the backing panel include a particular shape based on the ceiling assembly.

In some embodiments, the method 200 also includes illuminating the decoration panel using one or more light sources positioned in the ceiling assembly. In such embodiments, the illuminating can include providing an ambient lighting that extends around a perimeter of the decoration panel.

In some embodiments, the decoration panel is generated using one or more materials configured to endure temperatures above a threshold temperature for at least a threshold time period. Within examples, the threshold temperature corresponds to 500 degrees Fahrenheit.

In some embodiments, the ceiling assembly is coupled to a fuselage of the aircraft. In such embodiments, the coupling of block 206 includes coupling the decoration panel to the ceiling assembly without decoupling at least a portion of the ceiling assembly from the fuselage of the aircraft.

In some embodiments, the method 200 includes operations for replacing the decoration panel. For example, the method 200 includes removing the generic panel from the ceiling assembly to produce the opening in the ceiling assembly and expose the plurality of fasteners, decoupling the decoration panel from the ceiling assembly, removing the decoration panel through the opening in the ceiling assembly, inserting a replacement decoration panel through the opening in the ceiling assembly, and coupling the replacement decoration panel to the ceiling assembly using the plurality of fasteners (or a different plurality of fasteners) such that the replacement decoration panel extends across the opening in the ceiling assembly.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for installation of a decoration panel to an opening of a ceiling assembly comprising:
   the decoration panel; and
   a plurality of fasteners configured to couple the decoration panel proximate the opening,
   wherein the plurality of fasteners includes a first type of fastener positioned along a first edge portion of the decoration panel and a second type of fastener positioned along a second edge portion of the decoration panel when the decoration panel is coupled to the ceiling assembly proximate the opening, and
   wherein the second type of fastener comprises a set of clamp hooks and each clamp hook comprises a spacer portion, a hook portion and a bolt.

2. The system of claim 1, wherein the decoration panel comprises a decorative shell coupled to a backing panel, and wherein the decorative shell includes one or more designs.

3. The system of claim 2, wherein the decoration panel is configured to endure temperatures above a threshold temperature for at least a threshold time period.

4. The system of claim 1, wherein a surface area of the decoration panel is greater than an area of the opening, and wherein the decoration panel is at least semi-flexible.

5. The system of claim 1, wherein the first type of fastener comprises a set of hooks.

6. The system of claim 1, wherein the decoration panel is generated via an injection molding process.

7. The system of claim 1, wherein the decoration panel is configured to be flexed during insertion through the opening.

8. The system of claim 1, further comprising:
a generic panel that extends over an exterior circumference portion of the decoration panel and covers the plurality of fasteners when the decoration panel is proximate the opening.

9. The system of claim 1, wherein the decoration panel is an ornamental panel that has one or more decorative features.

10. The system of claim 1, wherein the decoration panel is made out of fiberglass.

11. The system of claim 1, wherein the decoration panel is positioned proximate one or more light sources when the decoration panel is proximate the opening.

12. The system of claim 1, wherein the decoration panel consists of at least a first material and a second material, and wherein the second material differs from the first material.

13. An aircraft comprising:
a fuselage;
a ceiling assembly coupled to the fuselage;
a decoration panel coupled to the ceiling assembly proximate to an opening in the ceiling assembly;
a plurality of fasteners that couple the decoration panel to the ceiling assembly, wherein the plurality of fasteners includes a first type of fastener positioned along a first edge portion of the decoration panel and a second type of fastener positioned along a second edge portion of the decoration panel when the decoration panel is coupled to the ceiling assembly proximate the opening; and
a generic panel coupled to the ceiling assembly such that the generic panel extends over an exterior circumference portion of the decoration panel and covers the plurality of fasteners;
wherein the second type of fastener comprises a set of clamp hooks and each clamp hook comprises a spacer portion, a hook portion and a bolt.

14. The aircraft of claim 13, wherein the decoration panel is configured to endure temperatures above a threshold temperature for at least a threshold time period.

15. The aircraft of claim 13, wherein a surface area of the decoration panel is greater than an area of the opening in the ceiling assembly, and wherein the decoration panel is at least semi-flexible.

16. The aircraft of claim 13, wherein the first type of fastener comprises a set of hooks.

17. The aircraft of claim 13, further comprising:
one or more light sources positioned in the ceiling assembly and configured to illuminate a perimeter of the decoration panel with ambient lighting.

18. The system of claim 1, wherein the plurality of fasteners includes a set of one or more through insert fasteners.

19. The system of claim 5, wherein each hook form the set of hooks comprises a spacer portion and a hook portion.

20. The system of claim 8, wherein the generic panel comprises a valence panel.

* * * * *